United States Patent [19]

Knollenberg et al.

[11] Patent Number: 4,740,988

[45] Date of Patent: Apr. 26, 1988

[54] LASER DEVICE HAVING MIRROR HEATING

[75] Inventors: Robert G. Knollenberg, Boulder; Ramin Lalezari, Denver; Kenneth R. Sample, Longmont, all of Colo.

[73] Assignee: Particle Measuring Systems, Inc., Boulder, Colo.

[21] Appl. No.: 929,497

[22] Filed: Nov. 12, 1986

[51] Int. Cl.$^4$ .............................................. H01S 3/03
[52] U.S. Cl. ........................................ 372/99; 372/33; 372/34; 372/42; 350/353
[58] Field of Search .................. 372/99, 33, 34, 42; 350/363, 353, 609, 607

[56] References Cited

U.S. PATENT DOCUMENTS 3,484,722  12/1969  Barker et al. .................. 350/353
4,615,033  9/1986  Nakano et al. .................. 372/99

Primary Examiner—James W. Davie
Assistant Examiner—Xuan Vo
Attorney, Agent, or Firm—Robert E. Harris

[57] ABSTRACT

A laser device is disclosed having mirror heating to enhance performance of the device by minimizing induced light absorption to thereby improve mirror quality. The mirrors of a laser device are commonly made of a substrate having a coating thereon formed by alternating layers of high and low refractive index materials, normally classified as refractory oxide materials, which materials are susceptible to formation therein of color centers, such as formation of F-centers when exposed to ultraviolet light, which color centers reduce mirror quality due to induced light absorption losses. By heating the mirror, the F-centers are substantially eliminated to thereby improve mirror quality and enhance the longevity of the laser device.

21 Claims, 3 Drawing Sheets

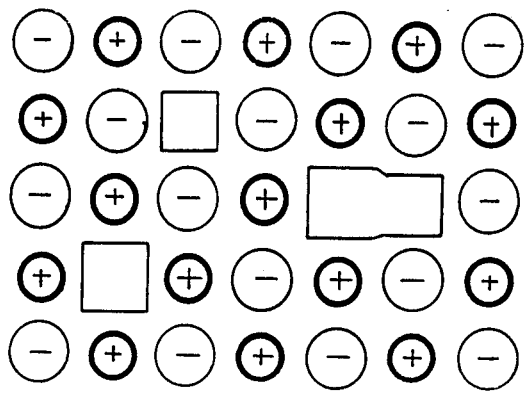
Fig_1
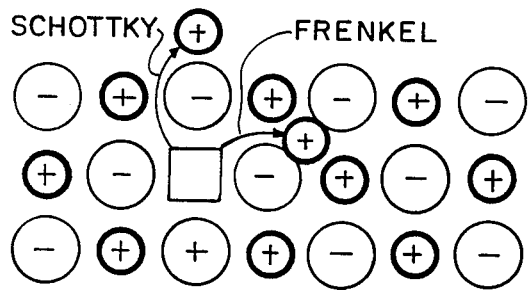
Fig_2
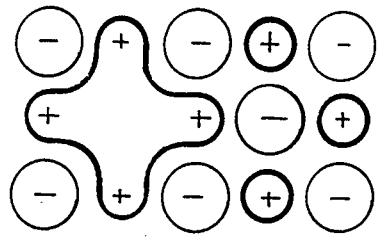
Fig_3

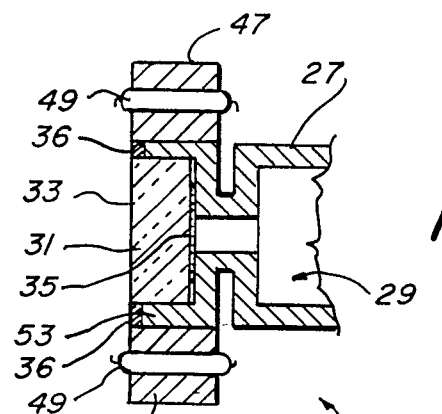
*Fig_6*
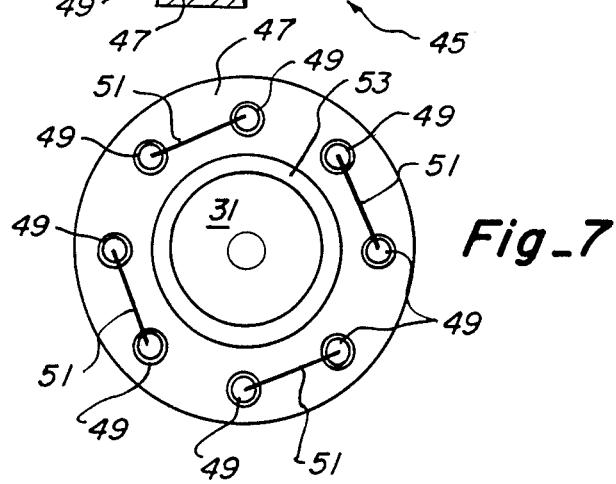
*Fig_7*
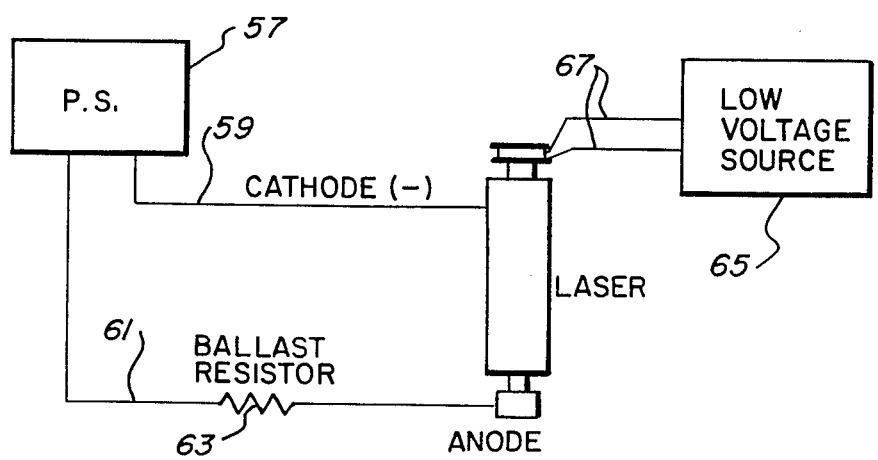
*Fig_8*

LASER DEVICE HAVING MIRROR HEATING

FIELD OF THE INVENTION

This invention relates to a laser device, and, more particularly, relates to enhancing laser device performance by heating a mirror of the laser device.

BACKGROUND OF THE INVENTION

Laser devices are now well known, and it is likewise well known to provide a mirror at one, or both, of the opposite ends of the laser tube. It is likewise now well known that such a mirror may be formed by a substrate having a reflective coating thereon, which coating can be formed by applying a plurality of layers of dielectric material to form the reflective coating.

The development of thin-film dielectric coating technology has advanced enormously since the inception of the laser, and, in essence, the laser became practical only after mirrors of very high reflectivity could be manufactured. The layers of film forming the reflective coating are normally vacuum deposited onto polished glass mirror blanks as alternating layers of high and low refractive index materials (usually refractory oxides) designed to generate enhanced reflectance at the selected laser wavelength via constructive interference. In general, the higher the spectral reflectance and the lower all other losses (i.e. diffused scatter, transmission, and absorption), the higher the mirror quality.

It is likewise now well known that heat can be applied to a lens arrangement or the like, including application of heat to a coating on the lens, but such heating has commonly heretofore been utilized to prevent fogging and the like (see, for example, U.S. Pat. Nos. 3,495,259, 4,355,861, 1,791,254, 2,442,913 and 2,376,710).

SUMMARY OF THE INVENTION

This invention provides mirror heating for the purpose of enhancing performance of a laser device by minimizing losses from induced light absorption due to color-centers in the reflective coating of the mirror.

It is an object of this invention to provide an improved laser device and method providing mirror heating.

It is another object of this invention to provide an improved laser device and method providing mirror heating to minimize losses from induced light absorption due to color-centers in the reflective coating of the mirror.

It is another object of this invention to provide an improved laser device and method that includes mirror heating to reverse F-center formation in refractive index materials forming a reflective coating on the substrate of a mirror.

It is still another object of this invention to provide a heating system for a laser device having a mirror one portion of which is susceptible to induced light absorption.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is an illustration of a pure ionically bonded crystal with a lattice vacancy shown at positive and negative ion sites and at a coupled pair of vacant sites of opposite sign;

FIG. 2 is an illustration of Schottky and Frenkel defects in an ionic crystal with arrows being provided to indicate displacement of the ions (in a Schottky defect, the ion is shown to move to the surface of the crystal, and, in a Frenkel defect, the ion is shown to move to an interstitial position);

FIG. 3 is an illustrative diagram of a formed F-center;

FIG. 6 is a partial side view illustration of the anode end of the laser device shown in FIG. 4 and illustrating a second embodiment of the heating system of this invention incorporated therein;

FIG. 7 is an end view of the anode end of the laser device as shown in FIG. 6; and FIG. 8 is a simplified electrical diagram illustrating connection of the power supply to the laser device and heating system.

DESCRIPTION OF THE INVENTION

Figure 4:
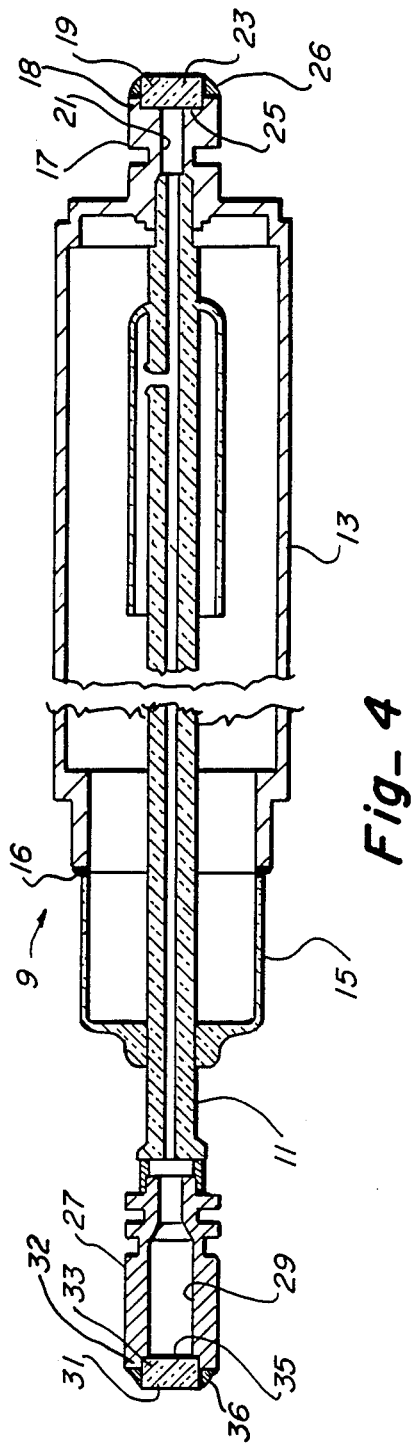
FIG. 4 is a simplified side view illustration of an HE-NE laser device having mirrors at the opposite ends of the laser tube.

One of the primary goals of material science is generally to provide a perfect material, and a perfect crystal, for example, is the ultimate in material perfection. Thin film optical coatings, however, are an area of material science wherein the very nature of the manufacturing process precludes perfection, since said coatings are inherently amorphous.

The process of forming such a material generally starts with as pure a material (and thus generally crystalline) as can be practically procured, and this material is then evaporated in a vacuum chamber where the material is deposited onto a substrate (in this case a mirror substrate), generally at an elevated temperature.

By alternately using high and low refractive index materials having a one-fourth wavelength optical thickness, a transparent glass blank can be transformed into a highly reflective mirror that is selectively reflective at the tuned wavelength (where the one-fourth wavelength is exactly periodic) and is relatively transmissive at other wavelengths. These films are generally amorphous (i.e. non-crystalline), and are invariably less perfect than the crystalline material from which they had been evaporated.

Any deviation in the crystal from a perfect periodic lattice or structure is an imperfection, with the common point imperfections being chemical impurities, vacant lattice sites, and extra atoms not in regular lattice positions. Line imperfections are called dislocations, and a crystal surface is a planar imperfection, with its surface electron and phonon states.

Crystals are, therefore, always imperfect in some respect unless infinite in extent. The nature of the common imperfections are fairly well understood for most solids, and much work has been heretofore accomplished concerned with the alkali and silver halides important to photographic processes, germanium and silicon as they relate to semiconductors, and copper and alloys in general. In fact, an alloy may represent a high concentration of point imperfections.

Many important properties are controlled as much by imperfections as by the nature of the host crystal, which may act only as a vehicle or solvent or matrix for the imperfections. The conductivity of some semiconductors, for example, is due entirely to trace amount of chemical impurities, the color of many crystals arises from imperfections, and the luminescence of crystals is nearly always connected with the presence of impurities. Also, diffusions of atoms may be accelerated enormously by impurities or imperfections, and mechanical and plastic properties are usually controlled by imperfections.

If thin films could be deposited to grow nearly perfect crystalline layers, these layers would have ideal optical properties. However, since mirror coatings involve many alternating layers of different materials, there is always strong dislocations between layers, and these boundaries are sources of increased diffuse scattering loss. Furthermore, it is difficult to grow useful crystalline layers in vacuum. The choice has therefore been to move away from crystalline states toward totally amorphous states, and in thin-film optical coatings, the most desirable film structure utilized today is amorphous.

Amorphous films can be grown more readily than can crystalline films. However, in most cases, films possess some internal crystallites which are generally deleterious to optical performance since a mixture of amorphous and crystalline states results in undesirable high diffuse scattering. Diffuse scatter and particle generated point-defects are the predominant sources of scattering losses found in coated mirrors.

In summary, in the absence of being able to produce consistent crystalline layers, it has been found to be more productive to stay completely away from crystalline films.

As brought out above, a limiting loss mechanism is absorption, and this can occur by a variety of means. While absorption is a greater problem in amorphous states than crystal states, the mechanisms are the same. To understand the mechanism in thin films, it is useful to examine the same phenomenon in simple ionic crystals. Obviously, absorbing impurities come to mind, however, other subtle forms of induced light absorption can occur.

In a crystal, such absorption can occur when there is a lattice vacancy or interstitial void. The simplest imperfection is a lattice vacancy, which is a missing atom or ion, also known as a Schottky defect. A lattice vacancy is often indicated in illustrations and in chemical modeling by a square, in the manner as is indicated in FIG. 1. A Schottky defect can be created in a perfect crystal by transferring an atom from a lattice site in the interior to a lattice site on the surface of the crystal, as indicated in FIG. 2.

In thermal equilibrium in an otherwise perfect crystal, a certain number of lattice vacancies are always present, because the entropy is increased by the presence of disorder in the structure. In metals with close-packed structures, the proportion of lattice sites vacant at temperatures just below the melting point is of the order of $10^{-3}$ to $10^{-4}$. But in some alloys, in particular, the very hard transition metal carides such as TiC, the proportion of vacant sites of one component can be as high as 50%.

Another vacancy defect is the Frenkel defect, as is also indicated in FIG. 2, in which an atom is transferred from a lattice site to an interstitial position, a position that is not normally occupied by an atom.

The presence of a lattice defect often leads to absorption, and a color center is a lattice defect that absorbs visible light. While an ordinary lattice vacancy does not color crystals, it does affect absorption in the ultraviolet (UV) range. The simplest color center is an F-center, which is named from the German word for color (Farbe).

F-centers can be produced in thin films by ultraviolet radiation, and an F-center is often identified by electron spin resonance as an electron bound at a negative ion vacancy, as indicated in FIG. 3. If the valence electron of the metal atom is not bound tightly to the atom, the electron migrates in the crystal and becomes bound to a vacant negative ion site. A negative ion vacancy in an otherwise perfect periodic lattice has the effect of an isolated positive charge in that it attracts and binds an electron.

The F-center is the simplest trapped electron center in crystals. The optical absorption of an F-center arises from an electric dipole transition to a bound excited state of the center. As is indicated in FIG. 3, an F-center is a negative ion vacancy with one excess electron bound at the vacancy. The distribution of the excess electron is largely on the positive metal ions adjacent to the vacant lattice site. These and other centers are usually identified by their optical properties.

Holes may also be trapped to form color centers. Hole centers differ, however, from electron centers in that a hole in the last orbital shell of an ion leaves it in a lower electronic configuration, whereas an electron added to the filled shell leaves the ion in a higher electronic configuration. The chemistry of the two configurations is different. The antimorph to the F-center is a hole trapped at a positive ion vacancy, but no such center has been successively identified to date.

The primary difference between thin-film materials and the ionic crystals above discussed is that the materials used are generally covalently bonded rather than ionically bonded. Also, the amorphous films can be best considered as material matrices rather than crystalline lattices. Most of the materials are transition metal oxides (refractory oxides) which are ordinarily transparent in the visible light range. Commonly used refractory oxide materials are $S_iO_2$, $T_iO_2$, $HfO_2$, $Ta_2O_5$, and $ZrO_2$. These materials characteristically form F-centers when exposed to ultraviolet light, inducing absorption.

When these materials are used in manufacturing of laser mirrors, the mirrors are most often sealed to the plasma discharge and exposed to rich ultraviolet light. Their performance is degraded with time and ultraviolet dosage, and the primary result of this induced absorption is reduction in laser output power.

Summarizing, the F-center is characterized by a trapped "free" electron which is ordinarily created by ultraviolet broken bonds local to the F-center. The "free" electron migrates to the F-center where it is trapped. The reduction of these trapped electrons and destruction of the absorbing electrons is thus of great importance to the longevity and enhancement of laser mirror coatings.

In this invention, a system and method are disclosed for increasing longevity of a laser by using a heater to heat the mirror, or mirrors. The mechanism by which the heater eliminates, or destroys, F-centers is primarily the result of thermal energy being added to the site and raising the "free" electron to an energy level where it can migrate back to a stable preferred site. It has been verified by our experiments, that temperatures in the range of 50° C. to 100° C. are typically sufficient to reverse F-center formation in most investigated materials. With the advent of hard sealed (glass-to-metal) mirrors, operation of mirrors at such temperatures is entirely feasible since processing steps require temperatures of about 450° C. for mirror sealing.

A typical laser construction is illustrated in FIG. 4. As shown, HE-NE laser device 9 conventionally includes a glass capillary tube 11 having a metal cathode 13 and a glass end wall 15 therearound. A glass-to-metal seal 16 is provided between the glass end wall and the metal cathode, as indicated in FIG. 4.

At the cathode end of the laser device, a metal cathode end section 17 with mirror retainer 18 is provided for connection of the cathode to the negative side of a power supply and for positioning mirror 19 adjacent to the end of, and in alignment with, discharge capillary bore 21 of section 17, which bore is also aligned with capillary tube 11. As is conventional, mirror 19 is formed utilizing a substrate 23 (normally a glass substrate) having a coating 25 thereon normally formed by layers of reflective material as above described. A glass-to-metal hard seal 26 is provided between substrate 23 and mirror retainer 18.

A metal anode 27 is positioned adjacent to capillary tube 11 at the end opposite to that of cathode 9. Anode 27 provides for connection of the positive side of the power supply to the laser tube and has a discharge capillary bore 29 therein aligned with capillary tube 11. Mirror 31 is received at mirror retainer 32 at the end of anode 27 and is aligned with bore 29 and capillary tube 11. Mirror 31 includes a substrate 33 (also normally a glass substrate) having a coating 35 thereon normally formed by layers of reflective materials as above described. A glass-to-metal hard seal 36 is provided between substrate 33 and mirror retainer 32.

Figure 5:
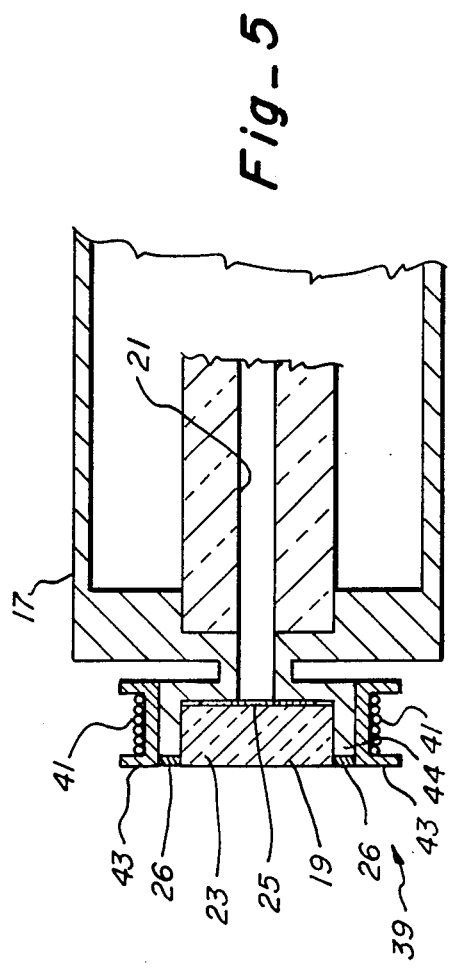
FIG. 5 is a partial simplified side view illustration of the cathode end of the laser device shown in FIG. 4 and illustratin one embodiment of the heating system of this invention incorporated therein.

Embodiment 39 of the heating system of this invention is shown in FIG. 5 positioned to heat mirror 19. Heater coil 41 is a length of wire coiled around a form (not shown) and pressed into cylindrical cup 43 with the cup being positioned around mirror cup 44. Mirror cup 44 is configured to retain and position mirror 19 within and surrounded by heater coil 41 so that when the heater coil is energized, heat is provided to the mirror.

A second embodiment 45 of this invention is shown in FIGS. 6 and 7 positioned to heat mirror 31. As shown, a cylindrical resistor potting form, or mandrel, 47 has a plurality of resistors 49 (typically 8 resistors for providing uniform heat distribution, as illustrated in FIG. 7) embedded therein with the resistors being connected in series with one another by leads 51 (as also indicated in FIG. 7). As best indicated in FIG. 6, mandrel 47 is positioned around mirror cup 53 of anode 27. Mirror cup 53 is configured to retain and position mirror 31 within and surrounded by mandrel 47 so that when current is passed through the resistors, heat is provided to the mirror.

While not specifically illustrated, it is to be understood that heating, or thermal energy processing, systems 39 and 45, as illustrated in FIGS. 5 through 7, could be utilized to heat, or provide thermal energy to, a mirror positioned at either the anode or cathode of the laser tube and the invention is not meant to be limited to the illustrated use as specifically shown in FIGS. 5 through 7.

As indicated in FIG. 8, a conventional power supply 57 can be utilized to energize the laser device with the negative side 59 of the power supply being connected with cathode 13 (while indicated in FIG. 8 and connected generally to the cathode end of the laser, lead 59 can be connected to cathode end section 17), and the positive side 61 being connected with anode 27.

When embodiment 45 (as shown in FIGS. 6 and 7) of the heater system is utilized, the resistors 49 forming the heating element can also be the ballast resistance (indicated generally by the numeral 63 in FIG. 8), which ballast resistance is necessary for operation of the laser device. In this embodiment, the ballast resistance thus serves as the heating system and is energized through power supply 57 to thus provide heat to the associated mirror.

When embodiment 39 (as shown in FIG. 5) of the heating system is utilized, then a conventional low voltage power supply 65 is utilized and leads 67 are connected to opposite sides of heater coil 41 for energization of the heater coil to cause heat to be produced and supplied to the associated mirror.

Regardless of which embodiment of the heating system is utilized, it has been found that sufficient heat can be generated at the reflective mirror, by the heating system of this invention, to reverse F-center formation. Tests have indicated that lasers having highly sensitive laser lines (such as, for example, HE-NE lasers operating at 543 nm, 594 nm, and 612 nm), that heretofore ceased operation in less than 100 hours, can be enhanced to last indefinitely (over several thousand hours) by adding mirror heating according to this invention, which heating is preferably applied to the associated mirror during the entire time during which the laser device is in operation.

From the foregoing, it should be appreciated that understanding and defeating F-center mechanisms in laser mirror coatings utilizing this invention has allowed creation of laser products with longevity far exceeding those heretofore possible.

What is claimed is:

1. A laser device having enhanced performance, said laser device comprising:
   laser means including electrodes and tube means having opposite end portions and having said electrodes enclosed therein;
   mirror means positioned at a least one end of said tube means, said mirror means having at least one coating thereon susceptible to induced light absorption;
   heating means;
   positioning means for positioning said heating means adjacent to said mirror means; and
   means adapted to cause said heating means to provide heat to said mirror means to minimize mirror losses due to said induced light absorption by said susceptible coating on said mirror means to thereby enable enhanced performance of said laser device.

2. A device of claim 1 wherein said coating includes a plurality of alternate layers of high and low refractive index materials, and wherein said heat provided by said heating means acts to substantially eliminate color centers in said coating.

3. The device of claim 1 wherein said heating means includes a wire coil, and wherein said positioning means includes a retainer having said wire coil received therein.

4. The device of claim 3 wherein said retainer is an outwardly opening and substantially cylindrically-shaped cup, and wherein said mirror means is positioned within a mirror retainer substantially within said cup.

5. The device of claim 1 wherein said heating means includes a plurality of resistors, and wherein said positioning means includes a mandrel having said resistors therein.

6. The device of claim 5 wherein said mandrel is a resistor potting form that is substantially cylindrical in shape and has said resistors embedded therein, and wherein said mirror means is positioned within a mirror retainer substantially within said mandrel.

7. The device of claim 1 wherein said means adapted to cause heat to be provided by said heating means includes a power supply connected with said laser device and said heating means.

8. The device of claim 7 wherein said means adapted to cause heat to be provided by said heating means includes ballast resistance means connected with said power supply.

9. In a laser device having a mirror with at least one coating thereon which is susceptible to induced light absorption, a thermal energy system comprising:
thermal energy producing means; and
positioning means for positioning said thermal energy producing means adjacent to said mirror whereby thermal energy produced by said thermal energy producing means provides sufficient thermal energy at said mirror such that mirror losses due to said induced light absorption by said coating on said mirror are substantially reduced to thereby enhance performance of said laser device.

10. The system of claim 9 wherein said heating means includes a wire coil, and wherein said positioning means includes a retainer having said wire coil received therein.

11. The system of claim 10 wherein said retainer is an outwardly opening and substantially cylindrically-shaped cup, and wherein said mirror is positioned within a mirror retainer substantially within said cup.

12. The system of claim 11 wherein said heating means includes a distributed resistance, and wherein said positioning means includes a mandrel having said distributed resistance therein.

13. The system of claim 12 wherein said mandrel is a resistor potting form that is substantially cylindrical in shape and has said distributive resistance embedded therein, and wherein said mirror is positioned within a mirror retainer substantially within said mandrel.

14. A laser device having enhanced performance, said device comprising:
a laser including electrodes and a tube having opposite end portions and having said electrodes enclosed therein;
a substrate having a reflective coating thereon formed by a plurality of alternating layers of high and low refractive index materials to thereby provide a mirror, said reflective coating being susceptible to induced light absorption due to formation of color centers therein;
first positioning means for positioning said mirror at one end of said laser tube;
electrical heating means;
second positioning means for positioning said electrical heating means adjacent to said mirror;
electrical means adapted to energize said electrical heating means whereby said electrical heating means provides heat to said mirror in an amount sufficient to substantially preclude formation of said color centers in said reflective coating and thereby enhance laser performance.

15. The devic of claim 14 wherein said alternating layers of high and low refractive index materials are refractory oxide materials, which materials characteristically form F-centers when exposed to ultraviolet light and thereby induce absorption, and wherein said heating means provides sufficient heat to reverse F-center formation and thereby substantially reduce induced absorption by said coating.

16. The device of claim 15 wherein said refractory oxide materials are selected from $S_iO_2$, $T_iO_2$, $HfO_2$, $Ta_2O_5$, and $ZrO_2$.

17. The device of claim 15 wherein said heating means provides heat to said mirror in a range between about 50° C. to 100° C.

18. A method for enhancing performance of a laser device having mirror means with at least one coating thereon which is susceptible to induced light absorption, said method comprising heating said mirror means to a temperature sufficient to preclude induced light absorption in said coating on said reflective mirror means.

19. The method of claim 18 wherein said mirror means includes a substrate having said coating formed by alternate layers of high and low refractive index material, which coating is susceptible to induced light absorption due to formation of color centers in said coating, and wherein said mirror means is heated to substantially preclude said formation of said color centers.

20. The method of claim 19 wherein said color centers are formed as F-centers within said coating when said coating is exposed to ultraviolet light, and wherein said mirror means is heated to reverse F-center formation.

21. The method of claim 18 wherein said mirror means is heated and maintained at a temperature of between about 50° C. to 100° C.

* * * * *

UNITED STATES PATENT AND TRADEMARK OFFICE
CERTIFICATE OF CORRECTION

PATENT NO. : 4,740,988

DATED : April 26, 1988

INVENTOR(S) : Knollenberg et al.

It is certified that error appears in the above-identified patent and that said Letters Patent is hereby corrected as shown below:

Column 2, line 26, "illustratin" should be --illustrating--.

Column 6, line 55, "a" should be --at--.

Signed and Sealed this

Sixth Day of September, 1988

Attest:

DONALD J. QUIGG

Attesting Officer      Commissioner of Patents and Trademarks